(12) United States Patent
Cable

(10) Patent No.: US 8,342,052 B2
(45) Date of Patent: Jan. 1, 2013

(54) NEUTRAL LOCK MECHANISM FOR VEHICLE SHIFTER

(75) Inventor: Fred Cable, Springfield, IL (US)

(73) Assignee: Honeywell International Inc., Morristown, NJ (US)

( * ) Notice: Subject to any disclaimer, the term of this patent is extended or adjusted under 35 U.S.C. 154(b) by 353 days.

(21) Appl. No.: 12/506,003

(22) Filed: Jul. 20, 2009

(65) Prior Publication Data

US 2011/0011196 A1    Jan. 20, 2011

(51) Int. Cl.
*B60K 20/06* (2006.01)
(52) U.S. Cl. .................................... 74/473.31; 74/473.3
(58) Field of Classification Search ...... 74/473.1–473.3, 74/473.31
See application file for complete search history.

(56) References Cited

U.S. PATENT DOCUMENTS

| | | | | |
|---|---|---|---|---|
| 727,923 A * | 5/1903 | Farwell | ........................ | 180/321 |
| 954,531 A * | 4/1910 | Mack | .............................. | 74/359 |
| 960,572 A * | 6/1910 | McKiearnan | ................... | 74/345 |
| 1,143,361 A * | 6/1915 | Conover | .................... | 74/473.23 |
| 1,571,430 A * | 2/1926 | Perea | ........................ | 74/473.33 |
| 2,198,681 A * | 4/1940 | Slack | ......................... | 74/484 R |
| 2,489,735 A * | 11/1949 | Zancan | ..................... | 74/473.22 |
| 2,598,428 A * | 5/1952 | Plexico | ..................... | 74/473.21 |
| 2,664,761 A * | 1/1954 | Martin | ......................... | 74/473.1 |
| 2,897,685 A * | 8/1959 | Thannhauser | ............... | 74/473.3 |
| 3,570,636 A * | 3/1971 | Franz et al. | .................. | 192/3.57 |
| 3,748,923 A * | 7/1973 | Babbitt et al. | ................. | 74/566 |
| 4,282,769 A * | 8/1981 | Sandrock | .................... | 74/473.23 |
| 4,649,768 A * | 3/1987 | Kusaka et al. | ............... | 74/484 R |
| 4,776,416 A * | 10/1988 | Morse | .......................... | 180/65.1 |
| 4,966,262 A | 10/1990 | Mieczkowski | | |
| 5,156,243 A * | 10/1992 | Aoki et al. | ...................... | 192/218 |
| 5,379,872 A | 1/1995 | Dorr et al. | | |
| 5,388,476 A | 2/1995 | Harger et al. | | |
| 5,566,583 A * | 10/1996 | Suzuki | ....................... | 74/473.21 |
| 5,647,818 A * | 7/1997 | Moody | .......................... | 477/99 |
| 5,775,166 A | 7/1998 | Osborn et al. | .................. | 74/475 |
| 5,899,115 A * | 5/1999 | Kataumi et al. | ........... | 74/473.18 |
| 6,055,881 A * | 5/2000 | Oda | ........................... | 74/473.31 |
| 6,073,511 A * | 6/2000 | Umezawa et al. | ......... | 74/473.25 |
| 6,325,196 B1 | 12/2001 | Beattie et al. | ............. | 192/220.4 |
| 6,349,609 B1 * | 2/2002 | Potter | .......................... | 74/473.2 |

(Continued)

FOREIGN PATENT DOCUMENTS

EP    0629796 B1    8/1997

(Continued)

*Primary Examiner* — Troy Chambers
*Assistant Examiner* — Terence Boes
(74) *Attorney, Agent, or Firm* — Ingrassia Fisher & Lorenz, P.C.

(57) ABSTRACT

A shifter apparatus is associated with a neutral lock lever and includes a detent ball bearing, a shaft seal, a detent spring, and a retention pin. A shaft associated with the neutral lock lever can be inserted into a matching hole configured within or integrated with a shifter housing. The shaft can be rotated if a cammed lobe portion associated with the shaft moves into an inner wall of the shifter housing. The retention pin can be pressed via an end of the neutral lock lever into a groove located on an outside wall of the shifter housing after the neutral lock lever is rotated into position. The retention pin rides inside the groove thereby limiting the rotation of the neutral lock lever. The neutral lock lever locks the shift lever in a neutral position preventing accidental movement of the vehicle in a forward and a reverse direction.

9 Claims, 5 Drawing Sheets

U.S. PATENT DOCUMENTS

| | | | |
|---|---|---|---|
| 6,431,339 B1 | 8/2002 | Beattie et al. | 192/220.4 |
| 6,938,509 B2 | 9/2005 | Bulgrien | |
| 7,174,802 B2 | 2/2007 | Wakayama | 74/473.35 |
| RE39,598 E | 5/2007 | Markyvech et al. | |
| 7,328,782 B2 | 2/2008 | De Jonge | 192/220.4 |
| 7,469,614 B2 | 12/2008 | Wang | 74/473.23 |
| 2004/0226801 A1 | 11/2004 | De Jonge et al. | 192/220.7 |
| 2006/0016287 A1 | 1/2006 | Grossman et al. | 74/473.21 |
| 2008/0134733 A1* | 6/2008 | Anastasiadis et al. | 70/89 |

FOREIGN PATENT DOCUMENTS

| | | |
|---|---|---|
| EP | 0902219 B1 | 6/2003 |
| WO | WO 01/08919 A1 | 2/2001 |

\* cited by examiner

NEUTRAL LOCK MECHANISM FOR VEHICLE SHIFTER

TECHNICAL FIELD

Embodiments are generally related to electromechanical devices and methods. Embodiments are also related to transmission shifters for use with vehicles. Embodiments are additionally related to neutral lock mechanisms for use with transmission shifters.

BACKGROUND OF THE INVENTION

A vehicle shifter is an electromechanical device attached to a vehicle that permits an operator to control the movement of the vehicle. Vehicle shifters typically include a neutral lock device in order to prevent the shifter from being accidentally shifted from a neutral gear position into a reverse or forward gear position, unless the vehicle is traveling at below a predetermined speed, and the brake pedal is depressed. The vehicle operator manually moves the shifter between the forward, neutral, and reverse detented positions in order to control the movement of the vehicle. The shifter offers a provision for the neutral lock device to be locked in the neutral position by actuating the neutral lock device mounted externally to a shifter housing. The neutral lock device locks the shifter in the neutral position, thereby preventing accidental movement of the vehicle in the forward and reverse direction.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved transmission shifter apparatus for use with vehicles.

It is another aspect of the present invention to provide for an improved method for assembling a neutral lock lever into the shifter apparatus.

The aforementioned aspects and other objectives and advantages can now be achieved as described herein. A shifter apparatus associated with a neutral lock lever can be configured to include a detent ball bearing, a shaft seal (e.g. rubber), a detent spring, and a retention pin (e.g. plastic). A shaft associated with the neutral lock lever can be inserted into a matching oblong hole configured in a shifter housing. The shaft can be rotated if a cammed lobe portion associated with the shaft moves into an inner wall of the shifter housing. The retention pin can be pressed via an end of the neutral lock lever into a groove (e.g., crescent shaped) located on an outside wall of the shifter housing after the neutral lock lever is rotated into position. The retention pin rides inside the groove, thereby limiting the rotation of the neutral lock lever. Such a limited rotation prevents the cammed lobe portion of the neutral lock lever shaft from aligning with the oblong hole in the housing so that the lever cannot be removed. The neutral lock lever locks the shift lever in a neutral position in order to prevent the accidental movement of the vehicle in a forward and/or a reverse direction.

The apparatus further includes a kick down push handle that is capable of providing a switch function for transmission kick down by pushing the handle downward. The "kick down" handle preferably includes four positions for forward speed control and three positions for reverse speed control, although it can be appreciated that variations to this arrangement may be implemented. The neutral lock lever located on the side of the shifter housing can be rotated to lock the handle in a neutral position to prevent movement of the handle. The neutral lock lever can be rotated to unlock the handle, which permits full movement of the handle for a forward or a reverse function. The neutral lock lever can be easily assembled in order to thereby provide an improved design feature with reduced part cost. The shifter housing provides an improved housing surface finish, an increased housing radius, and an improved label printing in order to improve appearance of the shifter apparatus. The neutral lock lever ensures that the shifter apparatus is in the neutral position, and prevents inadvertent and accidental movements of the vehicle employing the shifter apparatus and neutral lock.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
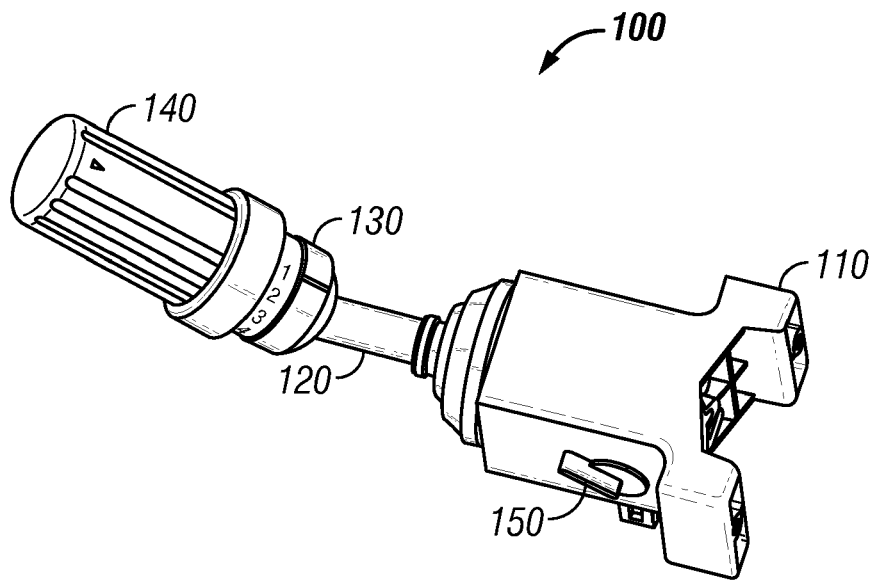
FIG. 1 illustrates a perspective view of a transmission shifter apparatus associated with a kick down handle, in accordance with an embodiment.

FIG. 1 illustrates a perspective view of a transmission shifter apparatus 100 that includes a shifter housing 110 and a "kick down" handle 140, in accordance with an embodiment. The transmission shifter apparatus 100 can be configured as an electromechanical device that provides a number of gear positions such as, for example, a forward position, a neutral position, and/or a reverse position. The shifter apparatus 100 can be attached to a vehicle (not shown) in order to permit an operator to control the movement of the vehicle. The shifter housing 110 can also be configured to secure the apparatus 100 to the vehicle structure.

The handle 140 includes a handle collar 130 to provide a switch functionality for transmission kick down by pushing the handle 140 downward. The handle 140 can be connected to the shifter housing 110 via a handle tube 120. In general, the handle 140 can function with four positions for forward speed control and three positions for reverse speed control. The shifter apparatus 100 is also associated with a neutral lock lever 150, which can be engaged in respective park, reverse, neutral and drive positions. It will be understood that in other embodiments, the shifter apparatus 100 may possess alternative configurations with additional transmission control positions and the automatic shifter apparatus 100 may have additional transmission control positions, or may have fewer transmission control positions, depending upon design goals and considerations.

Figure 2:
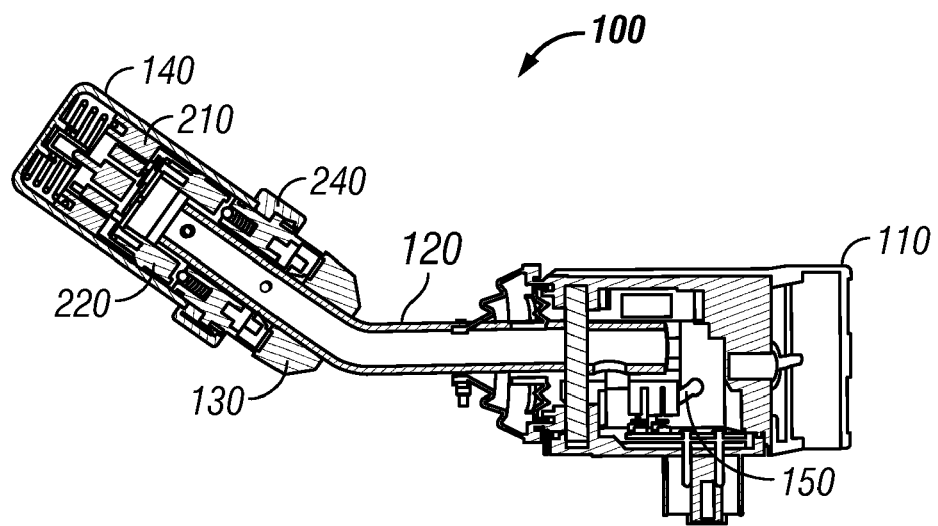
FIG. 2 illustrates a cross-sectional view of the transmission shifter apparatus associated with the kick down handle, in accordance with an embodiment.

FIG. 2 illustrates a cross-sectional view of the transmission shifter apparatus 100 associated with the handle 140, in accordance with an embodiment. Note that in FIGS. 1-9, identical or similar blocks are generally indicated by identical reference numerals. The shifter apparatus 100 can be connected to the transmission of a vehicle via a suitable linkage (not shown). In such applications, it is customary to disengage the transmission by placing the shifter apparatus 100 in a neutral position whenever the vehicle is not in operation.

The shifter housing 110 includes the neutral lock lever 150, which can be employed for securely maintaining the shifter apparatus 100 in a neutral position, thereby preventing movement in the shifter apparatus 100. The kick down handle 140 includes a commutator sleeve 210 that is composed of a number of circumferentially spaced segments to collectively represent a cylindrical surface. A circuit board base 220 can be utilized to configure speed control circuitry 350 for electrical communication with the shifter apparatus 100. Further, a handle seal 240 can be utilized to seal the handle 140 and protect the internal circuitry and related components from external factors.

Figure 3:
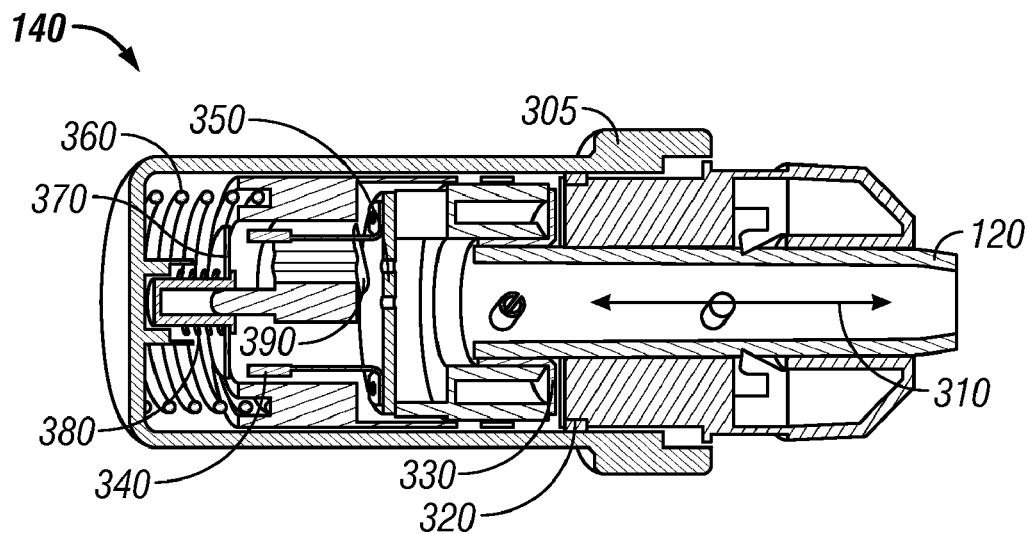
FIG. 3 illustrates a cross-sectional view of the kick down handle, in accordance with an embodiment.

FIG. 3 illustrates a cross-sectional view of the handle 140, in accordance with an embodiment. The handle 140 can be generically pushed front and back for forward, neutral, and reverse functions and pushed down for a kick down function. The handle 140 can be further rotated in a clockwise or counterclockwise direction in order to control the speed of the shifter apparatus 100. The handle 140 generally includes a handle cap 305 that is associated with a push function, a detent spring composed of a spring-loaded ball bearing 330, and a contact disk 370 in association with the speed control circuit 350. The handle cap 305 is attached to the handle 140 utilizing a handle seal 320. A handle cap return spring 360 pushes back the handle cap 305 to the original position when a desired operation is completed and the operator's thumb is released from the handle cap 305.

The contact disk 370 associated with a contact disc over travel spring 380 assists in the performance of an over travel function. The handle 140 further includes a speed control-rotating commutator 390 associated with a kick down contact post 340 for controlling the rotation of the handle 140. The contact post 340 can activate or de-activate the kick down functionality associated with the handle 140 in accordance with the position of the handle cap 305. The speed control-rotating commutator 390 can perform speed control operations in the forward and reverse directions for the shifter apparatus 100. The speed control circuit 350 can be utilized to control the speed of the shifter apparatus 100 by shifting the gear positions via a number of electrical wires 310.

Figure 4:
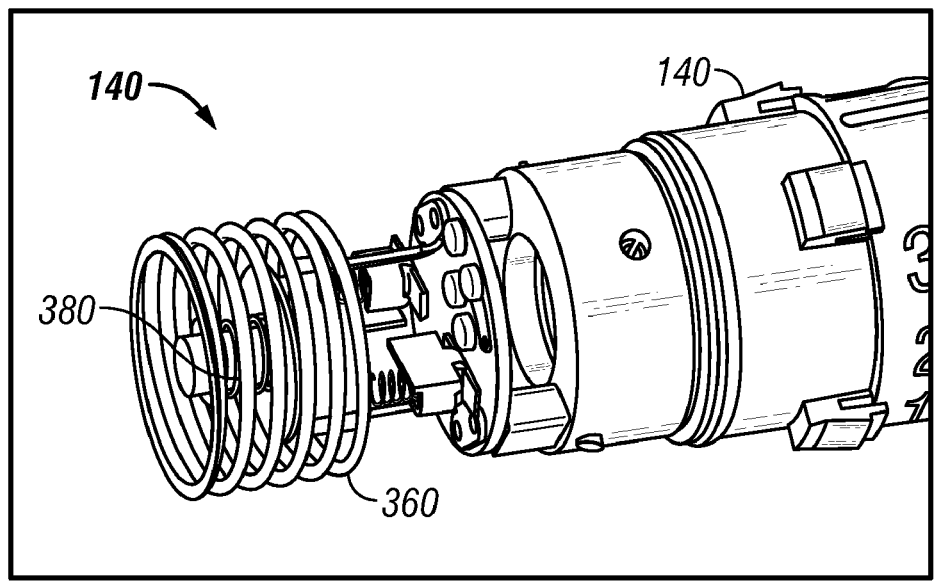
FIG. 4 illustrates a perspective view of the kick down handle associated with a return spring, in accordance with an embodiment.

The electrical wires 310 can be connected to the speed control circuit 350 via the handle tube 120. The electrical wires 310 transmit electrical signals to the shifter apparatus 100 with respect to the output of the speed control circuit 350. The handle 140 can be utilized to shift the position of the gear shifter apparatus 100 manually via the thumb of an operator. FIG. 4 illustrates a perspective view of the handle 140 associated with the return spring 360 and contact disc over travel spring 380, in accordance with an embodiment. The operator can actuate the gear positions of the shifter apparatus 100 with an increased reliability, without taking the hand off the handle 140. The handle cap return-spring 360 can provide the kick down function and the contact disc over travel spring 380 provides a speed output.

Figure 5:
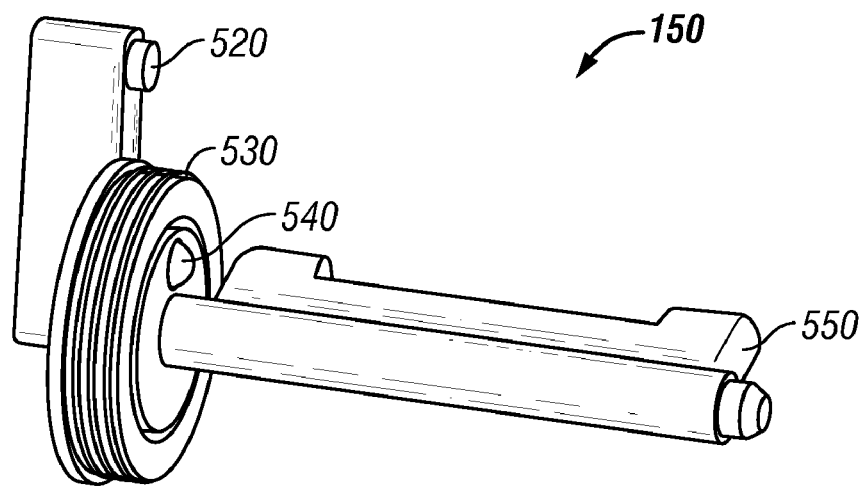
FIG. 5 illustrates a perspective view of a neutral lock lever associated with the transmission shifter apparatus, in accordance with preferred embodiment.

FIG. 5 illustrates a perspective view of the neutral lock lever 150 associated with the shifter apparatus 100, in accordance with preferred embodiment. The neutral lock lever 150 includes a retention pin 520, a shaft 550, a shaft seal 530, and a spring-loaded detent ball 540. The retention pin 520 may be configured from a material such as, for example, plastic depending upon design considerations. The shaft seal 530 may be configured from a material such as, for example, rubber, again depending upon design considerations. It can be appreciated that other types of materials may be utilized in place of the suggested material. The shaft 550 can be pivotally mounted to one end of the neutral lock lever 150 for moving the shaft 550 between a locked position and an unlocked position.

Figure 6:
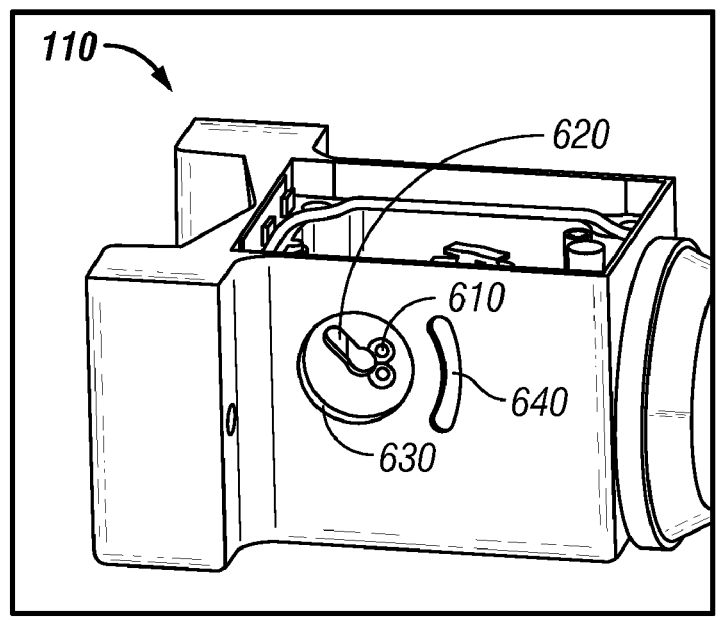
FIG. 6 illustrates a perspective side view of a shifter housing associated with the transmission shifter apparatus, in accordance with an embodiment.

FIG. 6 illustrates a perspective view of the shifter housing 110 associated with the shifter apparatus 100, in accordance with an embodiment. The shifter housing 110 includes a receiving hole 620 and a detent lever retention groove 640. The shaft 550 associated with the neutral lock lever 150 can be inserted into a sealing surface 630 of the shifter housing 110 via the receiving hole 620. The shaft 550 can be rotated if a cammed lobe portion associated with the shaft 550 moves past the inner wall of the shifter housing 110. Further, the spring-loaded detent ball 540 can be placed into a detent hole 610 such that there can be no further rotation in the shaft 550. The neutral lock lever 150 is preferably made in a conventional manner (e.g., injection molded) from any suitable material.

The retention pin 520 can be pressed through the end of the neutral lock lever 150 into the groove 640 (e.g., crescent shaped groove) formed on the outside wall of the shifter housing 110 after the neutral lock lever 150 is rotated into position. The retention pin 520 rides inside the groove 640 limiting the rotation of the neutral lock lever 150. The lever 150 cannot be removed if the retention pin 520 is pressed into the retention groove 640. Such a limited rotation does not permit the cammed lobe portion of the neutral lock lever shaft 550 to align with the oblong hole in the housing 110 so that the lever 150 cannot be removed.

Figure 7:
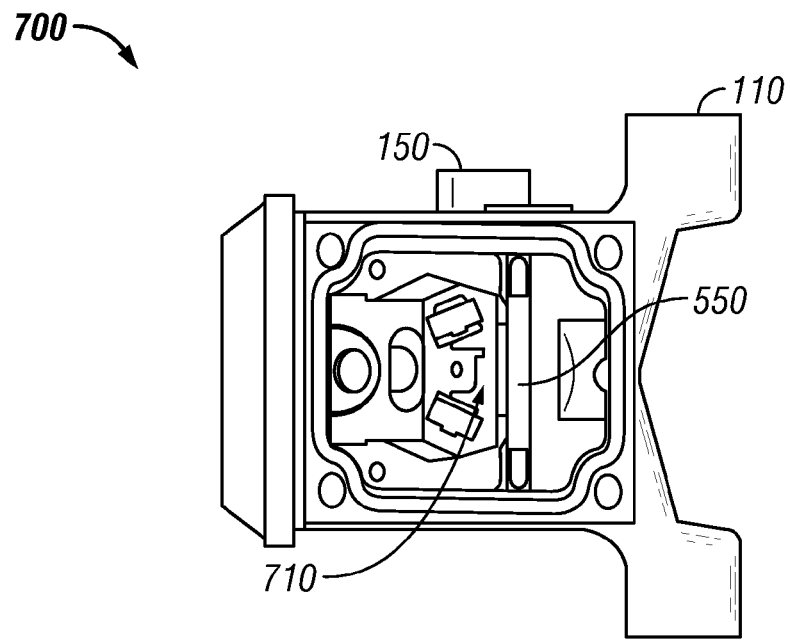
FIG. 7 illustrates a cross-sectional view of the shifter housing associated with the neutral lock lever in a locked position, in accordance with an embodiment.

FIG. 7 illustrates a cross-sectional view of the shifter housing 110 associated with the neutral lock lever 150 in the locked position 710, in accordance with an embodiment. Again, as reminder, in FIGS. 1-9, identical or similar blocks are generally indicated by identical reference numerals, although some of these figures may illustrate alternative embodiments. The neutral lock lever 150 located on the side of the shifter housing 110 can be rotated to lock the lever 150 in the neutral position to prevent movement of the handle 140. When the neutral lock lever 150 is in the locked position 710, there can be no movement in the shifter apparatus 100. The neutral lock lever 150 locks the neutral position to prevent the accidental movement of the vehicle in the forward or reverse direction.

Figure 8:
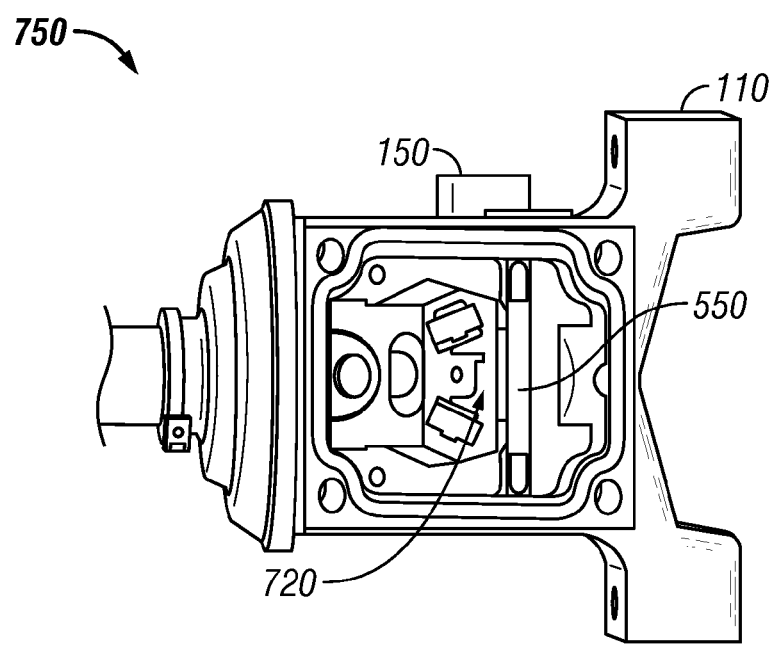
FIG. 8 illustrates a cross-sectional view of the shifter housing associated with the neutral lock lever in an unlocked position, in accordance with an embodiment.

FIG. 8 illustrates a cross-sectional view of the shifter housing 110 associated with the neutral lock lever 150 in the unlocked position 720, in accordance with an embodiment. The neutral lock lever 150 can be rotated to unlock the lever 150, which permits full movement of the handle 140 for a forward or reverse function. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

Figure 9:
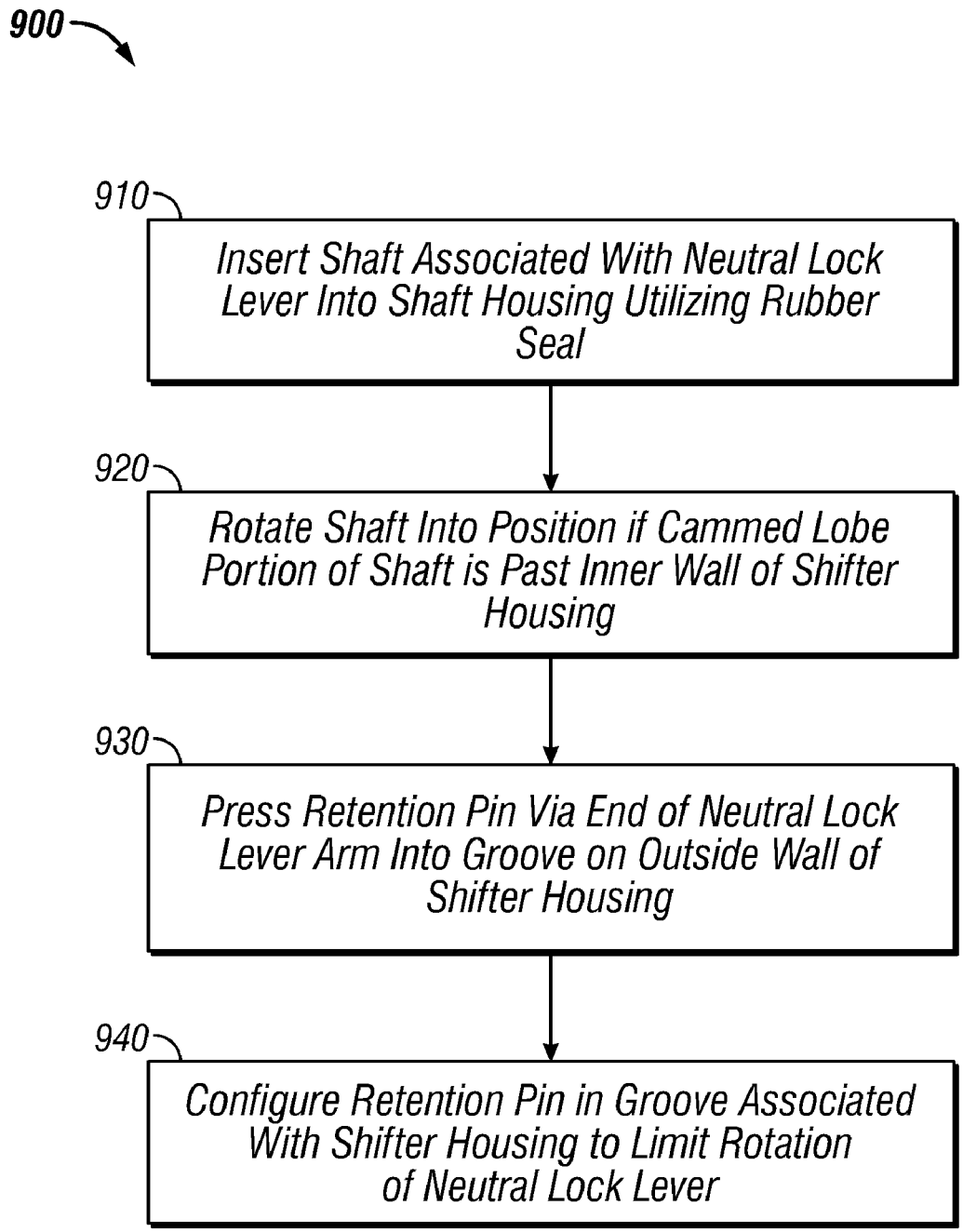
FIG. 9 illustrates a high level flow chart of operation illustrating logical operational steps of a method for assembling the neutral lock lever into the transmission shifter apparatus, in accordance with an alternative embodiment.

FIG. 9 illustrates a high level flow chart of operations depicting logical operational steps of a method 900 for assembling the neutral lock lever 150 into the transmission shifter apparatus 100, in accordance with an alternative embodiment. The shaft 550 associated with the neutral lock lever 150 can be inserted into the shifter housing 110 utilizing the seal 530, as indicated at block 910. Next, as described at block 920, the shaft 550 can then be rotated into position if the cammed lobe portion of the shaft 550 is past the inner wall of the shifter housing 110. The retention pin 520 can be pressed via an end of the neutral lock lever arm 150 into the crescent groove 640 formed on the outside wall of the shifter housing 110, as illustrated at block 930.

The retention pin 520 can be configured in the crescent groove 640 associated with the shifter housing 110 in order to limit the rotation of the neutral lock lever 150, as illustrated at block 940. The shifter apparatus 100 can function as a safety device to maintain the neutral lock lever 150 of the vehicle's transmission in the neutral position, thereby preventing damage or injury that may occur if the shift lever 150 is accidentally or unintentionally jarred. The shifter housing 110, in association with the shifter apparatus 100, can provide a number of advantages such as, for example, an improved housing surface finish, an increased housing radius, and improved label rendering. The disclosed embodiments also provide other extremely important advantages such as ensuring that the vehicle is in a neutral position in order to prevent inadvertent or accidental movements.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A transmission shifter apparatus, said apparatus comprising:
    a shifter having a housing, the housing comprising an outer wall, an inner wall, a plurality of detent holes formed in said outer wall, and a receiving hole that extends through said inner and outer walls;
    a lever having a shaft with a portion that protrudes along a length of said shaft, said shaft extending through a seal into said receiving hole, said receiving hole having a shape that matches a shape of said shaft and said portion, wherein said portion is rotatable when located past said inner wall of said housing;
    a retaining pin which rides in a retention groove formed in said outer wall to limit a rotation of said lever past said inner wall of said housing and prevent an alignment of said portion of said shaft with said receiving hole so that said lever is incapable of being removed from said receiving hole; and
    a spring-loaded detent ball surrounded by said seal and located proximate to said lever, said spring-loaded detent ball rotated with said lever and selectively disposed in one of said plurality of detent holes to at least inhibit rotation of said lever with respect to said housing.

2. The apparatus of claim 1 wherein said retention groove is crescent shaped.

3. The apparatus of claim 1 further comprising a handle having a handle collar for shifting at least one gear position of said shifter manually via a handle cap, said handle connected to said housing through a handle tube.

4. The apparatus of claim 1 wherein said portion that protrudes along a length of said shaft comprises a cammed lobe formed from and integrated with said shaft.

5. The apparatus of claim 1 wherein said seal comprises rubber.

6. The apparatus of claim 1 wherein said retention groove is curve shaped.

7. A method of forming a transmission shifter apparatus, said method comprising:
    configuring a shifter with a housing having an outer wall, an inner wall, a plurality of detent holes formed in said outer wall, a retention groove that extends through said inner and outer walls, and a receiving hole that extends through said inner and outer walls;
    forming a lever that includes a shaft, a retaining pin, and a spring-loaded detent ball, the shaft having a portion that protrudes along a length of said shaft, said shaft extending through a seal into said receiving hole;
    configuring said receiving hole with a shape that matches a shape of said shaft and said portion, wherein said portion is rotatable when located past said inner wall of said housing;
    forming a retention groove in said outer wall;
    locating said retaining pin in said retention groove so that said retaining pin rides in said retention groove to limit a rotation of said lever past said inner wall of said housing and prevent an alignment of said portion of said shaft with said receiving hole so that said lever is incapable of being removed from said receiving hole when said shifter is locked in a neutral position; and
    selectively disposing said spring-loaded detent ball in one of said plurality of detent holes to at least inhibit rotation of said lever with respect to said housing.

8. The method of claim 7 further comprising modifying said portion that protrudes along a length of said shaft to comprise a cammed lobe formed from and integrated with said shaft.

9. The method of claim 7 further comprising connecting a handle to said housing through a handle tube, said handle having a handle collar for shifting at least one gear position of said shifter manually via a handle cap.

* * * * *